(No Model.)

E. P. HOWE.
BRAKE FOR TRICYCLES.

No. 344,530. Patented June 29, 1886.

Witnesses.
Arthur Zipperlen.
John F. C. Prentlich.

Inventor.
Edward P. Howe.
by Crosby Gregory attys

UNITED STATES PATENT OFFICE.

EDWARD P. HOWE, OF NORTHBOROUGH, ASSIGNOR OF ONE-HALF TO JOHN J. SHAW AND CHARLES R. ROGERS, OF PLYMOUTH, MASSACHUSETTS.

BRAKE FOR TRICYCLES.

SPECIFICATION forming part of Letters Patent No. 344,530, dated June 29, 1886.

Application filed March 18, 1886. Serial No. 195,676. (No model.)

*To all whom it may concern:*

Be it known that I, EDWARD P. HOWE, of Northborough, county of Worcester, and State of Massachusetts, have invented an Improvement in Tricycle-Brakes, of which the following description, in connection with the accompanying drawings, is a specification, like letters on the drawings representing like parts.

This invention has for its object to construct a tricycle-brake which may be readily applied to retard the progress of the machine any degree desired, and which will remain in any position placed by the rider until positively moved.

The invention consists of a depending frame to which an upright hand-lever is pivoted, and a rock-shaft extending parallel with the main axle, combined with a curved arm rigidly connected with the rock-shaft, and means, substantially as will be described, controlled by the hand-lever for moving the said arm to partially rotate the rock-shaft; also, of a rock-shaft extending parallel with the main axle, and a cross-piece rigidly secured thereto, combined with a drum or pulley mounted upon the main axle, and a band, cord, or chain passing over the said drum or pulley, the ends of the said band, cord, or chain being connected with the cross-piece, whereby the said band, cord, or chain may be tightened or loosened upon the drum as the shaft carrying the rock-shaft is rocked.

The depending frame is connected by curved or bent arms to the boxes in which the main shaft or axle rotates, or to some other stationary frame-work. The means employed for controlling the movement of the curved arm attached to the rock-shaft consists of a spiral spring one end of which is connected with the depending frame near the pivot of the upright hand-lever, the opposite end of the said spring being connected with a hook, which passes over or is hung upon the said curved arm, the said hook having a loop or strap rigidly connected with it at right angles, which passes around the shank of the hand-lever, a friction-roller being mounted within the loop and bearing upon the top of the curved arm, so that as the hand-lever is turned on its pivot the loop carrying the friction-roller is caused to move over the top of the curved arm, and by the tension of the spiral spring is caused to remain in whatever position placed, owing to the peculiar curve given to the arm.

Figure 1:
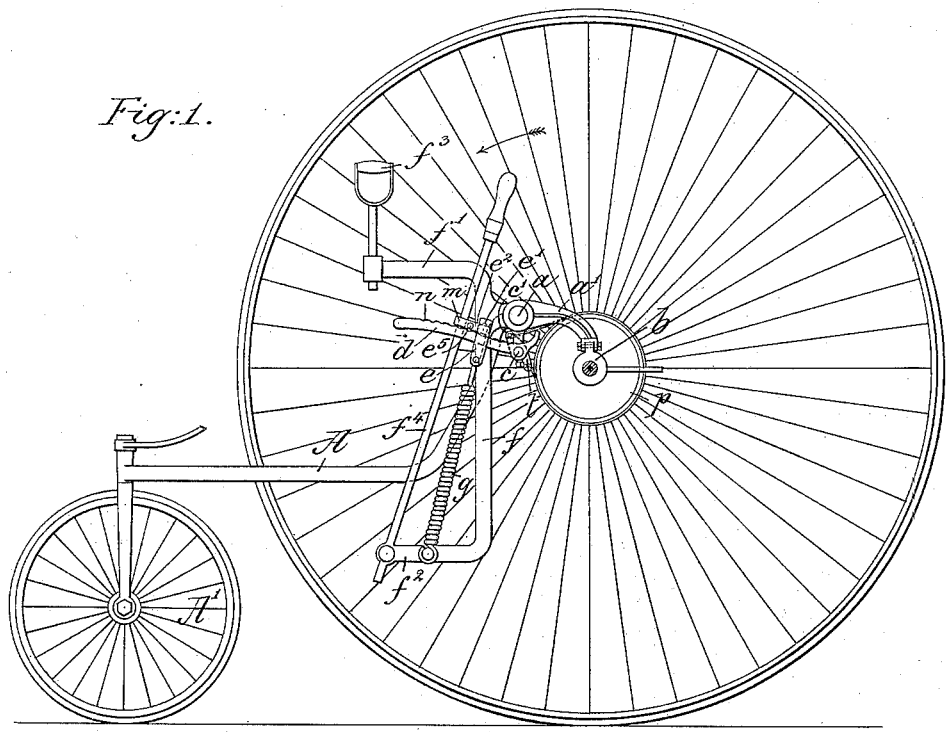
Figure 2:
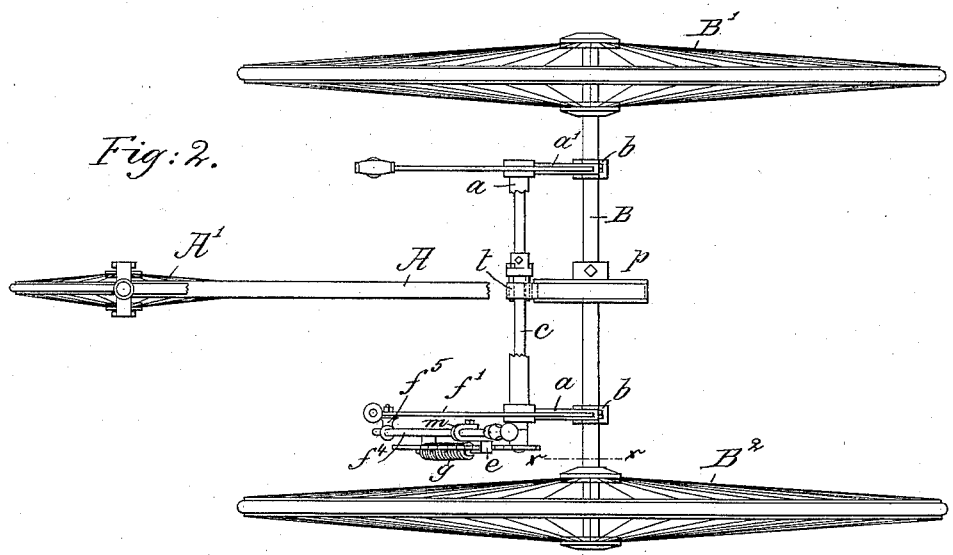

Figure 1 shows in vertical section a tricycle taken on the dotted line $x$ $x$, Fig. 2, having a brake embodying this invention applied thereto; and Fig. 2 a top view of Fig. 1, but showing the wheel, which is removed in said figure.

The frame-work A is of any suitable construction to support the operating parts, comprising among their elements the steering-wheel A'.

The main axle B, revolving in boxes $b$, carries the drive-wheels B' B². A cross-bar, $a$, extending parallel with the axle B, is connected thereto by curved or bent arms $a'$, attached in any usual or suitable manner to the boxes $b$, one such curved arm being herein shown at each end of the cross-bar $a$; but it is obvious that any suitable number may be employed as braces or re-enforcing pieces.

A rock-shaft, $c$, is mounted to turn in hangers or ears $c'$, depending from the cross-bar $a$, at its opposite ends, said rock-shaft thus extending parallel with relation to the axle B. A curved lever, $d$, is rigidly connected with one end of the rock-shaft $c$, at an angle thereto and in juxtaposition with a depending frame, $f$, connected with the cross-bar $a$.

The depending frame $f$ has two right-angled arms, $f'$ $f^2$, the arm $f'$ carrying the hand-piece $f^3$, and the arm $f^2$ having pivotally connected with it by a swivel connection, $f^5$, an upright hand-lever, $f^4$. A spiral spring, $g$, is also attached to the lower arm, $f^2$, of the depending frame $f$, extending upward, and connecting at its upper end a hook, $e$, the engaging end $e'$ of which passes over and moves upon the top of the curved arm or lever $d$, a friction-roller, $e^2$, (see dotted lines, Fig. 1,) being interposed within the hooked end $e'$ and rotating upon a pin, $e^3$. A loop or strap, $m$, is passed around the shank of the hand-lever $f^4$ and rigidly connected with the hook $e$, preferably by the pin $e^3$, a pin, $e^5$, extending transversely of the loop $m$, serving to retain the hand-lever in position at the forward end of the said loop.

The top surface of the curved lever $d$ may be scalloped if desired, as at $n$.

A cross-piece, $t$, is rigidly mounted upon the rock-shaft $c$, intermediate of its length, to the opposite ends of which the ends of a band, cord, or chain, $o$, are connected, the said band, cord, or chain passing over a drum or pulley, $p$, fixed upon the axle B, to rotate therewith.

The brake is operated as follows: The machine being in motion the hand-lever $f^4$ is turned on its pivot in the direction of the arrow, carrying with it the hook $e$, by means of the loop or strap $m$, and by the direction of the curved lever $d$, which is eccentric to the hand-lever $f^4$, the said curved lever is depressed, thereby rocking the shaft $c$ and moving the cross-piece $t$, tightening the band $o$ about the drum or pulley $p$, to thereby retard the progress of the machine.

As the spring $g$ at all times draws upon the hook $e$ to a more or less extent, the said hook is caused to bear firmly upon the curved lever $d$ in all positions, that the hand-lever $f^4$ may remain in any position set until positively moved by the rider. It will thus be seen that the brake may be placed in any position desired, or set to govern the progress of the machine at will, the rider not being obliged to continually control the same, simply moving it when necessary. This feature is of especial advantage in descending hills, where the brake may be set in any position, there to remain until positively moved. The brake herein described is also simple, and efficient to satisfactorily accomplish all the results necessary to a tricycle-brake.

I claim—

1. The frame, and hand-lever pivoted thereto, and a rock-shaft, combined with a curved lever connected with the said rock-shaft, and means, substantially as described, controlled by the hand-lever, for raising and lowering the curved lever to turn the rock-shaft, all as set forth.

2. The frame, and hand-lever pivoted thereto, the rock-shaft, and curved lever mounted thereon, combined with the spring-controlled engaging devices, substantially as described, controlled by the hand-lever, to move the curved lever and rock the shaft, all as set forth.

3. The frame and hand-lever pivoted thereto, the rock-shaft and curved lever thereon, combined with a spring-controlled engaging device, substantially as described, controlled by the hand-lever, for moving the curved lever, and a braking device, substantially as described, operated by the rock-shaft, all as set forth.

4. The rock-shaft, and braking device, substantially as described, operated by it, combined with a lever connected with said rock-shaft to rock it, and means, substantially as described, controlled by the rider, for moving the lever, all as set forth.

5. The rock-shaft, and braking device, substantially as described, operated by it, combined with the curved lever connected with the said rock-shaft to operate it, the hand-lever turning on a pivot eccentric to the said curved lever, and engaging devices carried by the hand-lever to raise and lower the curved lever, and also retain the hand-lever in any position that it may be set, all as and for the purpose set forth.

In testimony whereof I have signed my name to this specification in the presence of two subscribing witnesses.

EDWARD P. HOWE.

Witnesses:
  BERNICE J. NOYES,
  F. CUTTER.